United States Patent
McLamb et al.

(10) Patent No.: US 7,114,097 B2
(45) Date of Patent: Sep. 26, 2006

(54) AUTONOMIC METHOD TO RESUME MULTI-THREADED PRELOAD IMAGING PROCESS

(75) Inventors: Patrick Donald McLamb, Bahama, NC (US); John Mese, Cary, NC (US); Nathan J. Peterson, Raleigh, NC (US); Rod David Waltermann, Rougemount, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 493 days.

(21) Appl. No.: 10/741,352

(22) Filed: Dec. 19, 2003

(65) Prior Publication Data

US 2005/0154938 A1  Jul. 14, 2005

(51) Int. Cl.
*G06F 11/00* (2006.01)
(52) U.S. Cl. ............................................ 714/20; 714/15
(58) Field of Classification Search .................. 714/15, 714/20
See application file for complete search history.

(56) References Cited

U.S. PATENT DOCUMENTS

| | | | |
|---|---|---|---|
| 5,928,337 A | 7/1999 | Wieringa | |
| 6,266,767 B1 | 7/2001 | Feiste et al. | |
| 6,549,914 B1 | 4/2003 | Valys | |
| 6,718,489 B1 * | 4/2004 | Lee et al. | 714/43 |
| 7,017,077 B1 * | 3/2006 | Lowen et al. | 714/20 |
| 2002/0035707 A1 | 3/2002 | Matsufusa | |
| 2002/0104096 A1 | 8/2002 | Cramer et al. | |
| 2002/0105670 A1 | 8/2002 | Maruyama | |
| 2002/0138762 A1 | 9/2002 | Horne | |
| 2002/0143575 A1 * | 10/2002 | Hansen et al. | 705/2 |
| 2002/0165902 A1 | 11/2002 | Robb et al. | |
| 2003/0059123 A1 | 3/2003 | Omori et al. | |
| 2003/0061537 A1 | 3/2003 | Cha et al. | |
| 2003/0084377 A1 | 5/2003 | Parks et al. | |
| 2003/0086110 A1 | 5/2003 | Parry | |
| 2003/0131282 A1 * | 7/2003 | Lowen et al. | 714/20 |

* cited by examiner

*Primary Examiner*—Bryce P. Bonzo
*Assistant Examiner*—Michael Maskulinski
(74) *Attorney, Agent, or Firm*—Scott W. Reid; Dillon & Yudell LLP

(57) ABSTRACT

A method and data processing system for providing a preload imaging process that is self-healing. The state information of a single or multi-threaded preload environment is autonomically recognized and stored in a log file along with the corresponding file images that are being preloaded. The log tracks the image files and related state information for a plurality of simultaneously executing (preloading) threads. When a crash occurs during the preload process, the log information is dynamically analyzed to determine a safe point within the respective threads to resume the preload operation. The preload process is then autonomically resumed from the safe location without necessarily having to restart the entire process.

24 Claims, 5 Drawing Sheets

AUTONOMIC METHOD TO RESUME MULTI-THREADED PRELOAD IMAGING PROCESS

BACKGROUND OF THE INVENTION

1. Technical Field

The present invention relates generally to data processing systems and in particular to the preload imaging process on a data processing system. Still more particularly, the present invention relates to a method and system for enabling autonomic resumption of stalled preload imaging processes on a data processing system.

2. Description of the Related Art

Conventional data processing systems are manufactured with hardware and software components (e.g., basic input output system (BIOS)) that enable the data processing system to load new application software to the hard drive and preload other software components from memory or a storage device to the hard drive in order to prepare the system for executing the loaded applications. These software applications are installed via a preload imaging process, by which the individual image files and other supporting software are first installed on the hard drive in some installation sequence before the full application is made operational on the system. Conventional methods complete the preload imaging process in a serialized manner, where each individual file image of the application(s) was loaded one at a time.

Serialized installation of the software components that make up the preload image is required when each subsequent individual component has a, dependency on a previous component. However, it is common for the applications to contain independent components or groups of components, which are all stored on the source medium but do not have any dependency with other components. From both a manufacturing and preload-efficiency perspective, the one-dimensional (serialized) preload process limits the speed and efficiency of delivering preload images. The process unnecessarily aligns non-dependent components with each other into a serialized preload process.

In order to provide a system engineer with information on the status of a serialized preload, a log may be employed to record the status. This log may at times enable the engineer to manually resume a preload that has crashed from some other location other than the very beginning of the preload process (i.e., without a complete restart).

Recent developments are being undertaken to identify ways of improving the efficiency of preload imaging process, which would substantially eliminate the need for serial loading of component files of an application during preload imaging processes. Technological developments in other software processing areas have led to the implementation of multithreaded operation and related functionality.

One development that is evolving in this field is that of extending the preload process from the serialized implementation to a parallel processing implementation for independent component files. However, this expansion of processing methods (i.e., parallel execution of a preload process) complicates the logging feature of a serialized implementation since current design of the log only allows for a serial listing of status information as the individual files are being loaded. With parallel implementation of the preload process, determining a safe and accurate resume point would be a very difficult and time intensive task for an engineer.

However, various complexities exist that have so far prevented implementation of a non-serialized approach to preload imaging process. In particular, any movement towards such an implementation is limited by the currently implemented serialized response mechanisms for handling recovery from a crash during preload.

Occasionally, in today's computer manufacturing environment, the computer's preload imaging process crashes. When a crash occurs during preload, a test engineer is required to assess why the crash occurred and, following such determination, modify the preload process data so that a complete (or partial) restart may be provided. When the crash occurs at a sensitive point in the process, however, it is oftentimes not possible to complete the preload process successfully without completely restarting the process (i.e., begin preloading all applications following the serialized preload process that crashed). Such a complete restart is very time consuming and inefficient, particularly when the crash occurs after several independent potions of the preload operation have completed successfully.

The present invention recognizes the limitations that exist with current implementations of the preload imaging process and the limitations of the one dimensional log file for tracking the serialized process. The invention recognizes that it would be desirable to provide a method and system for logging state and other relevant information for multiple concurrent preload imaging processes, which necessarily contain interlaced messages. The invention further recognizes that it would be beneficial to provide a preload imaging process that is self-healing which autonomically provides a safe and accurate resume of the process following a crash.

SUMMARY OF THE INVENTION

Disclosed is a method, system, and program product for providing a preload imaging process that is self-healing. The state information of a single or multi-threaded preload environment is autonomically recognized and stored in a log file along with the corresponding file images that are being preloaded. The log tracks the image files and related state information for a plurality of simultaneously executing (preloading) threads. When a crash occurs during the preload process, the log information is dynamically analyzed to determine a safe point within the respective threads to resume the preload operation, The preload process is then autonomically resumed from the safe location without necessarily having to restart the entire process. Accordingly, the invention provides safe and accurate resume following a crash while completing the multi-threaded preload imaging process.

In one implementation, the computer system includes a crash response/resume utility (CRRU) that manages the process-tracking functionality of the log file and the crash response features. The information within the log file is recorded in human readable format but contains necessary key words that define state information, thread identifying information, and file dependency information, etc. Following a crash, the CRRU parses the log file for debug and state information about the ongoing preload process. This information along with other information within the log file are then utilized for autonomically deducing the state of a preload imaging process and resuming that process after restoring the appropriate context information.

In one embodiment, the process is backed up until it is safe enough to allow a restart. The CRRU further undoes the preload actions/operations between the crash and the safe spot at which the resume commences.

When the crash occurs during a non-sensitive location within the preload imaging process, the CRRU backs up the execution path and resumes the process at a location immediately following the last completed file within the process (i.e., the beginning of the file at which the crash occurs or the end of the previous file). If the crash occurs at a sensitive location within the preload process, the CRRU evaluates the location of the crash and selects a restart position at a point that enables the preload process to resume from the last "safe" spot in the overall process for the entire system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method, system, and program product for providing a multi-threaded preload imaging process that exhibits self-healing functionality. According to the invention, the preload imaging process is defined as the execution of script files that deploy a preload/configuration to a computer system's hard drive. The invention assumes that a multi-threaded implementation of preload imaging processing is provided and expands upon such an implementation to provide self-healing functionality within a multi-threaded preload imaging process.

The invention introduces two new software implemented components, which may be described as a single utility and supporting resource or separate components. These components a re a multi-column (i.e., not serial) log table and a crash response/resume utility (CRRU).

The multi-column log table is created to capture state information within a multi-threaded preload imaging operation/process. Organization of the preload process within the log table is achieved by sorting log entries based on several state criteria. The log table is specifically designed to accommodate non-serialized (or parallelized) restorable preload imaging.

The CRRU monitors the multi-threaded imaging processes and extracts useful information based on predefined conditions. The information extracted is then stored within the log table along with the thread identifier to enable later access to specific ones of the recorded log entries. The crash response utility is able to quickly respond to a crash occurring during preload imaging of one or more files across the various threads, by backing up the process for each affected thread to a previous logged state and resuming the preload imaging process from the previous logged state. The invention provides a re-startable preload process utilizing the CRRU.

Figure 1:
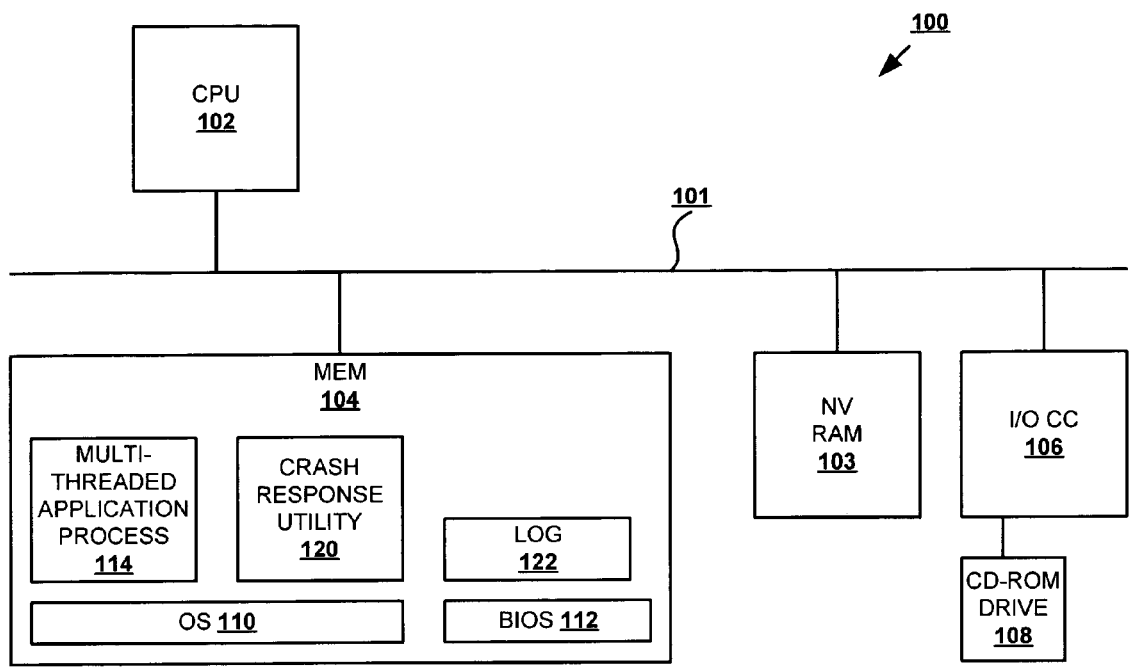
FIG. 1 is a block diagram of a data processing system, within which the features of the present invention may advantageously be implemented.

Referring now to the figures, and particularly FIG. 1, there is illustrated an exemplary data processing system having hardware and software components by which the various functional features of the invention may advantageously be implemented. Hardware components of data processing system 100 include processor (or CPU) 102, non-volatile memory (NVRAM) 103, system memory 104 and I/O controller (I/O CC) 106, each interconnected to the other components via interconnect 101. NVRAM 103 stores settings of system setup programs, including, in one embodiment, the image files for preload operation. I/O CC 106 has attached thereto CD-ROM drive 108, which represents an input mechanism for loading application files during installation or other preload imaging process.

Stored within memory 104 are software components, namely operating system (OS) 110, basic input output system (BIOS) 112 and at least one multithreaded application 114. According to the illustrated and described embodiment, image files of multithreaded application 114 are preloaded. The actual preload imagine operation may occur during boot of the system (as during a BIOS boot) or at any time thereafter at which the multithreaded application needs to be confirmed for execution/operation on data processing system 100. The preload imaging operation may be one in which file images of the application are preloaded into memory so that the application may operate in a smooth manner. The invention applies to any and all forms/types of preload imagine processes, including both serial processing and parallel processing of one or multiple applications.

In addition to the above software, also provided within memory (or on a removable storage medium, e.g., disk inserted into CR-ROM drive 108) is CRRU 120. CRRU 120 is a software-based component that completes a series of functions to enable adequate and efficient response to crash conditions during a preload imaging operation. CRRU 120 completes several functions within data processing system 100. First, CRRU 120 maintains a log 122 of file imaging and associated status information for the preload imaging processes. Second, CRRU 120 manages the process-tracking functionality of the log file and the crash response features. The information within the log file is recorded in human readable format but contains necessary key words that define state information, thread identifying information, and file dependency information, etc.

Third, following a crash, the CRRU 120 parses the log file for debug and state information about the ongoing preload process. This information, along with other information within the log file, is then utilized for autonomically deducing the state of a preload imaging process. Fourth, the CRRU 120 initiates a resumption of the imaging process after restoring the appropriate context information and locating a safe resume spot. Fifth, CRRU 120 further undoes the preload actions/operations between the crash and the safe spot at which the resume commences.

In one embodiment, the process is backed up until it is safe enough to allow a restart. When the crash occurs during a non-sensitive location within the preload imaging process, the CRRU backs up the execution path and resumes the process at a location immediately following the last completed file within the process (i.e., the beginning of the file at which the crash occurs or the end of the previous file). If the crash occurs at a sensitive location within the preload process, the CRRU evaluates the location of the crash and selects a restart position at a point that enables the preload process to resume from the last "safe" spot in the overall process.

Figure 2:
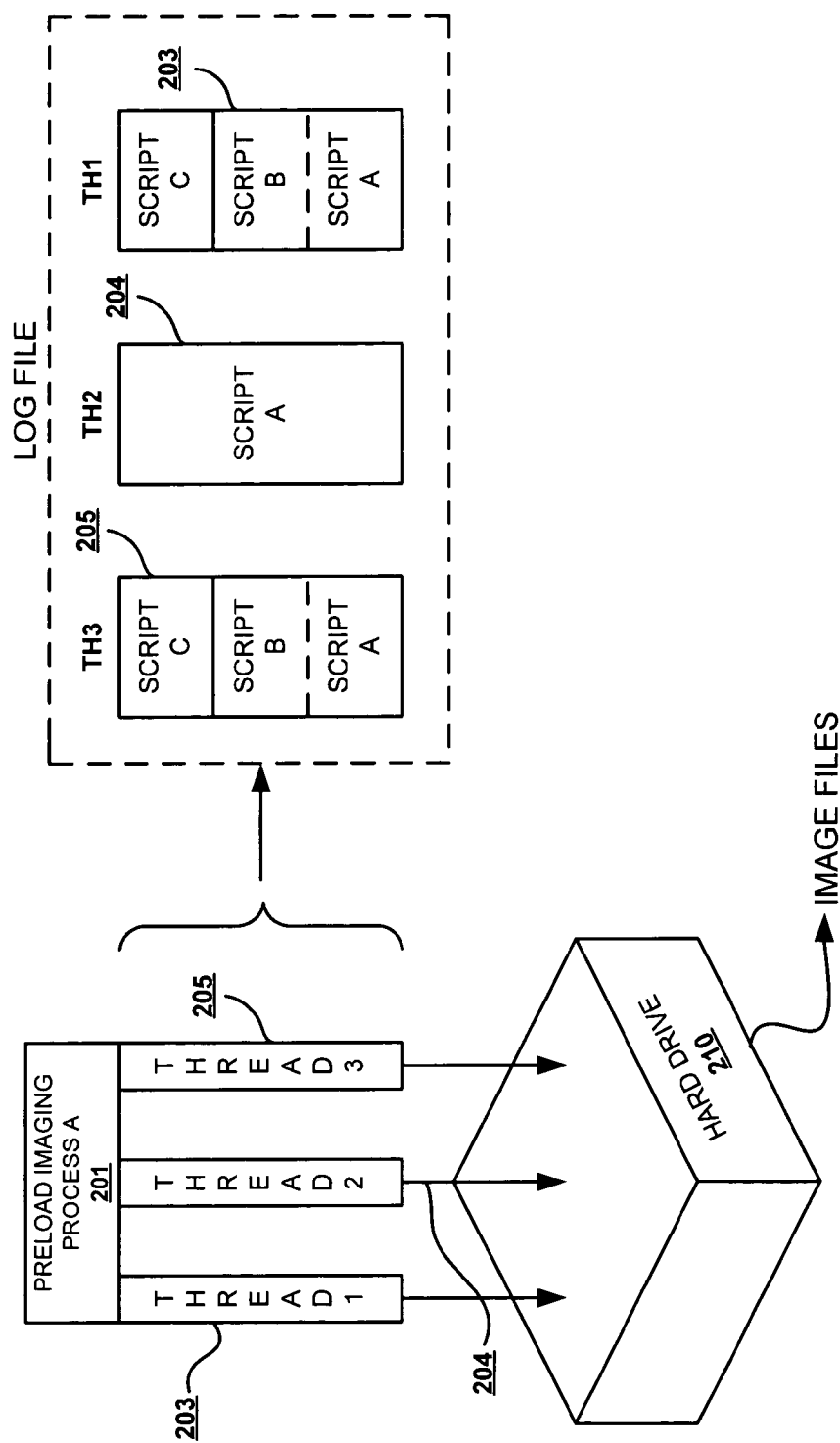
FIG. 2 is a block diagram illustrating the multithreaded structure of the preload imaging processes on the data processing system of FIG. 1 according to one embodiment of the invention.

FIG. 2 illustrates an example multi-threaded preload imaging process, with process A 201, comprising three separate execution threads, thread1 203, thread2 204, and thread3 205. The file structure of each thread is further illustrated as comprising one or more scripts, with each sequential script labeled alphabetically (A–C). The scripts are indicated as being separate components of the thread. However, scripts having a relational dependency are shown separated by dashed lines, while those that do not have a relational dependency are shown separated by solid lines. Also, scripts of the same thread are processed in sequential order while scripts of different threads may be processes concurrently. Each thread may comprise any number of individual scripts.

Each thread provides a series of image files on hard drive 210 following the preload imaging process. During preload imaging process, script A is processed first, followed by script B, then script C, and so on. Further, according to the invention, each thread is tracked separately within the log table and according to the scripts contained within the thread.

To accommodate the multiple threads and scripts within the multiple thread in a multi-threaded preload imaging process, the log table of the preload imaging process is dynamically configured into a two dimensional structure. Given the occurrence of a relational dependency among some components (scripts), scripts are organized into multiple levels, each level capable of being linked to a following or preceding (or adjacent) level or sequence of levels. Scripts processed at the same level are "independent" of each other, i.e., they may complete their preload imaging concurrently. Scripts contained within the same level may only be dependent on components in previous levels. Additionally, scripts within the same level may have an antecedent relationship to components in following levels. With these linear relational definitions, all scripts grouped horizontally can be installed in parallel, while scripts in vertical levels are processed serially.

Figure 3:
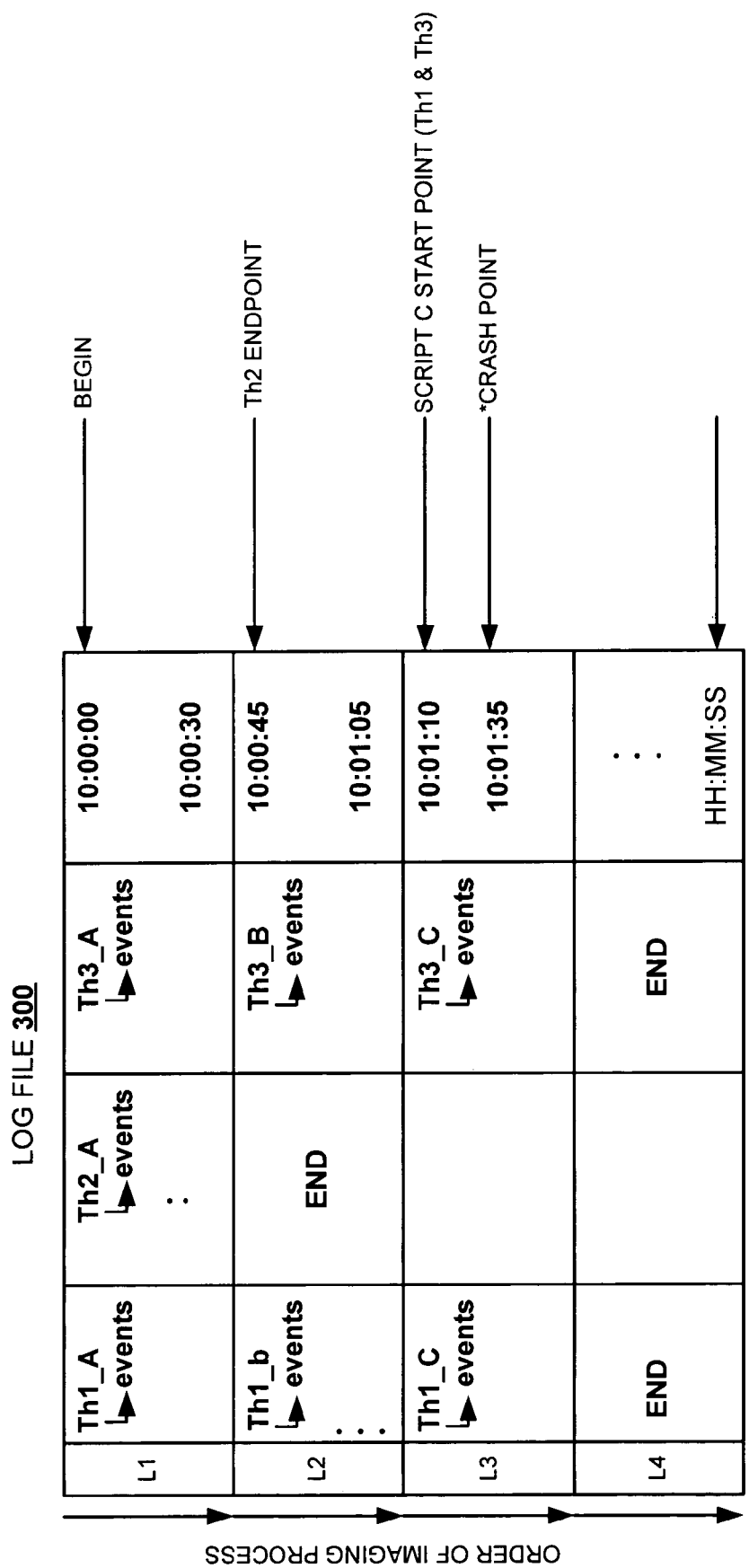
FIG. 3 is a table depicting an exemplary logging function of the crash response/resume utility in accordance with one embodiment of the invention.

A sample log table and some contents are illustrated by FIG. 3. As shown therein, log table 300 tracks the three threads of preload process A of FIG. 2. Preload imaging process of each thread is tracked in columns of the log table (i.e., thread1 in column 2 and thread 3 in column 3, etc.). The exemplary levels (L1–L4) for individual imaging process of scripts are also track along the first column. Associated with threads 1 and 3 are three script files (A–C) across three of the levels provided. Thread 2 has a single script file. In the illustrative embodiment a timestamp in the form HH:MM:SS is provided for one or more registered times for execution, completion of execution, and encountering an error/exception. That is, the timestamp records the system time when the various script processes are implemented, and whenever another activity of interest occurs (e.g., a break in the processing).

As indicated by FIG. 3, the log table may be capable of holding data related to each possible level of script within a single thread. Each script needs to be uniquely identified in order to determine restart points. As each script is executed, an entry is created in the log file, which contains data that allows for state information to be restored. Thread information is captured from the execution stack, simplified, and maintained in an internal execution stack. A unique identifier may be created, for example, by hashing together the thread ID (e.g., TH1) from the internal execution stack with the name of the script (C) into a character string (TH1_C). This character string is used to identify which log entry belongs to a particular thread and script. Also, additional/different events may be provided depending on the implementation.

It is important to note within the context of providing safe restart of the preload process, that threads are independently traced. The log table maintains all relevant relationship data among levels within each thread. This enables each thread to be treated independently of the other threads following a crash.

According to one example, assume thread 1 crashes at level 3 and all level 2 processes are vital to a proper restart of thread 1, then the CRRU would back up the process to level 2, find correct state information, and implement a restart from level 3. However, assuming thread 3 is processing the same levels concurrently with thread 1 and the level 3 process of thread 3 is independent of (i.e., not tied to) level 2, then a resume/restart would restart thread 3 from level 3 (and not level 2 as with thread 1).

Figure 4:
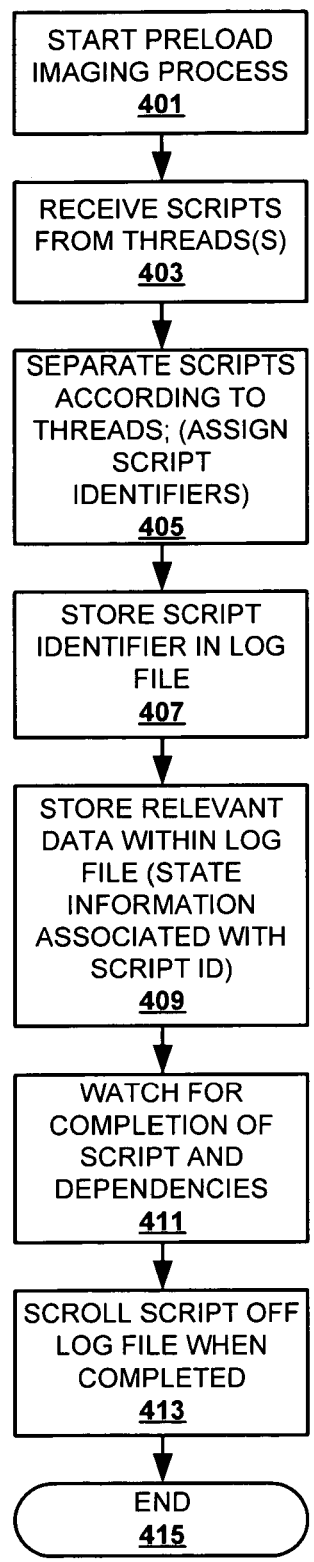
FIG. 4 is a flow chart depicting the process by which the crash response utility generates and maintains the process log, such as the log of FIG. 3, during the preload imaging process according to one embodiment of the invention.

FIG. 4 is a flow chart illustrating the process by which the log table is generated and maintained during preload imaging. Step 401 depicts the preload imaging process beginning. The scripts are then received from the multiple executing threads as indicated at step 403. The scripts are separated according to their respective threads and their associated script identifiers as shown in step 405. The script identifier is stored in the log table as shown at step 407. Then, relevant data/information is stored along with the identifying information within the log table as shown at step 409. The CRRU monitors for the completion of scripts, as depicted in step 411. Once the script has completed execution, the script is scrolled off the log table, as illustrated at block 413. The process then ended at block 415.

The log file may potentially contain a large amount of information related to the preload process and each thread within a multithreaded preload process. The log file is parsed and sorted according to the unique identifier (hash of the thread id and the script name). It is further sorted based on timestamp. A stack is then maintained based on the events captured in the log. Events signaling the beginning of execution of a thread are pushed onto the stack while events signaling the completion of execution of a thread are popped off.

In one embodiment, however the CRRU only maintains the last safe starting spot at which the current threads may be initiated. That is, the log table is maintained as a restricted FIFO register that allows processes to scroll out of the log table if the process is nottied or related to a later process that may crash. This scrolling feature is completed on a thread-by-thread basis.

Figure 5:
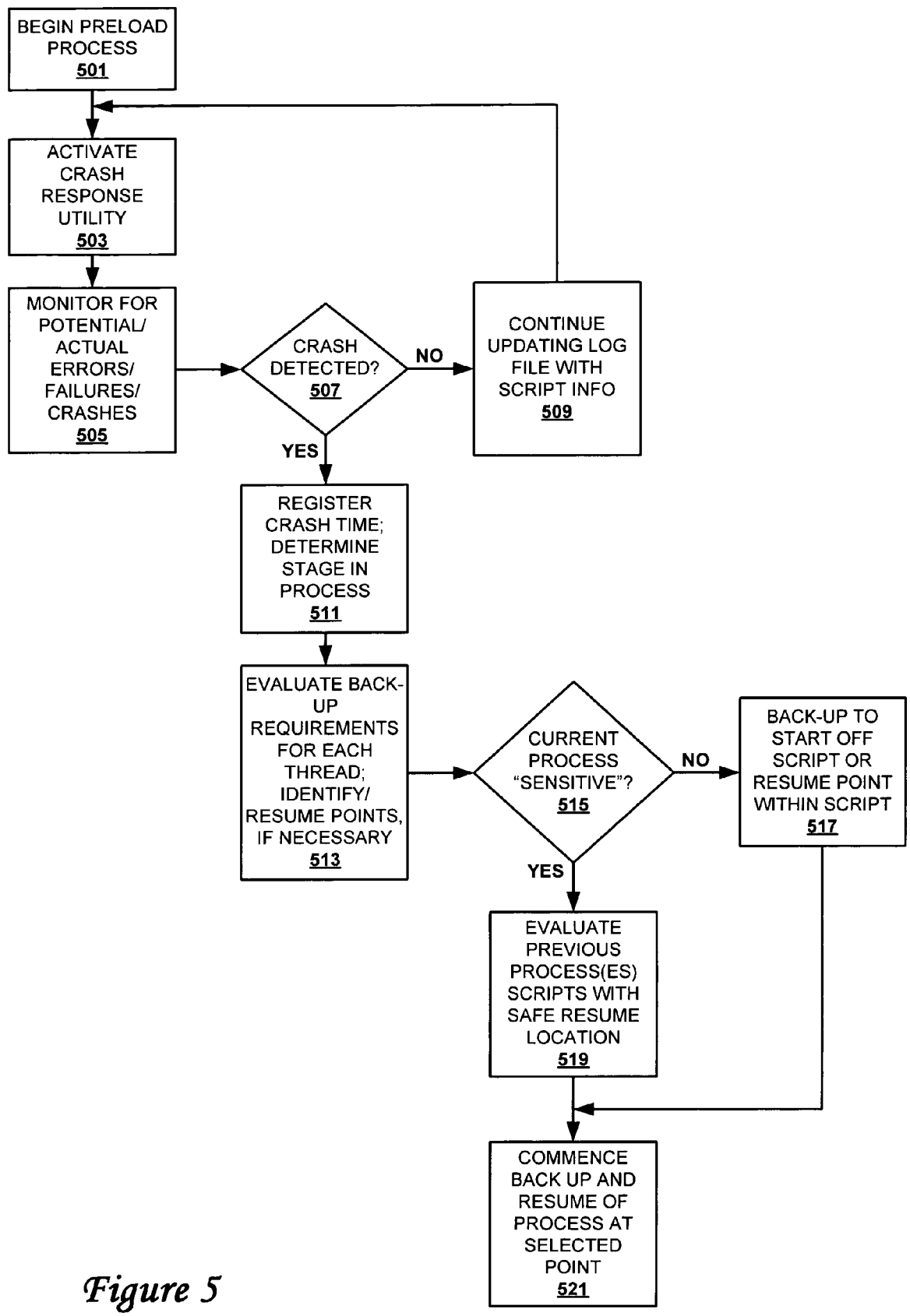
FIG. 5 is another flow chart depicting the process by which the crash response utility provides autonomical response to a detected crash of the preload imaging process to enable a quick restart at a safe point in the process in accordance with one implementation of the invention.

FIG. 5 illustrates a flow chart of the process by which the CRRU monitors the preload imaging process and responds to a failure or crash in the preload process. The process begins at step 501 when the multithreaded preload imaging process is initiated and the CRRU is activated. The log file is opened and as indicated at block 503, the CRRU saves the operating data (e.g., system state information) of the executing threads to the log table on a thread-by-thread basis.

The CRRU monitors for the occurrence of a crash in one of the threads as shown at decision block 505. If a crash does not occur, the crash response utility continues to update the log file with most current information of the system and process status. However, when a crash occurs, the CRU registers the crash and determines the position within the process the crash occurred as shown at block 507. Once the exact location is determined (i.e., what timestamp and which script was being processed), the CRRU then checks each thread to determine back-up requirements for each thread, as shown at block 508. If an error/exception event is encountered then a resume point is marked at that point in the process. All concurrent threads at the breakpoint are marked for resumption as well. If at any time state information appears corrupted, i.e. event information or line numbers appear out of order, then a resume point is set just prior to the point of corruption.

The CRRU 120 parses a log table that provides debug and state information about the ongoing preload process. Since the crash response typically requires a restart of each thread of the imaging process, each thread must be restarted, although at their independently deduced execution spot. Thus, following a crash during preload, the information within the log file is analyzed to autonomically deduce the state of a preload imaging process as shown at block 509. Then, once determined, a resume is issued for the process after restoring the appropriate context information as depicted in block 511. Prior to the actual resume, a determination is made at block 513 whether the crash occurred at a "sensitive" point in the process or during standard install portion of the preload process. When the crash occurs during a standard install portion of the preload process, the crash response utility backs up the preload execution path and resumes the process at a point prior to the crash as shown at block 515.

However, when the crash occurs at a sensitive point in the preload process, the CRRU evaluates the location of the crash, as shown at block 517. The CRU then selects a restart position at a point that enables the preload process to resume from the last "safe" spot in the overall process as depicted at block 519. The process is backed up until it is safe enough to allow a restart, which may require a complete restart of all processes. If the resume point is at a sensitive part in the process, e.g. partitioning of a computer hard drive, the resume point may be reversed to a safer point to resume. Additionally actions between the crash point and the actual resume point may need to be undone and the CRRU undoes the preload actions/operations between the crash and the safe spot at which the resume commences as indicated at block 519. This ensures a clean environment for the restarted process. Then, the preload process is restarted/resumed as indicated at block 521.

While the invention has been described with a separate CRRU providing the response functionality, the invention also provides a recovery method that is built into the preload imaging process or part of the BIOS operating system. With this implementation, a simple restart after breaking will automatically restore the state information necessary to resume the multi-threaded preload imaging environment.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
    initiating a multi-threaded preload imaging process that includes concurrently loading image files of at least two threads, each comprises of multiple script files executed in sequential order;
    recording at predetermined intervals a log of an operating state of said data processing system along with a current script file being executed for each thread; and
    when a failure occurs during said multi-threaded preload imaging process, autonomically responding to said failure by resuming execution of said script files for each of said thread at a point prior to a point said failure occurred determined to be safe for resuming said process.

2. The method of claim 1, further comprising dynamically analyzing the log to determine said safe spot for each of said threads, wherein said safe spot is determined based on data recorded within said log.

3. The method of claim 2, wherein dynamically analyzing step includes parsing a log file, and providing debug and state information.

4. The method of claim 2, wherein said script files are utilized for deploying a preload/configuration to a computer system's hard drive and contains the state information, the thread information captured from the execution stack, timestamps, and the event data for each log entry.

5. The method of claim 1, further comprising:
    determining whether a current executing script file at a point said failure occurs is independent of previous script files of said thread;
    backing up a preload process for said thread to a safe point, wherein:
        when said current executing script file is dependent on a previous script file said preload process is backed-up to the start of the previous script files to which said current executing script file is dependent; and
        when said current executing script file is independent of previous script files, said preload process is backed-up to a start of said current executing script file.

6. The method of claim 1, further comprising:
    determining whether a first thread's current executing script file at a point said failure occurs is independent of adjacent and previous script files of a second thread;
    backing up a preload process for both said first thread and said second thread to a safe point, wherein:
        when said current executing script file is dependent on an adjacent or previous script of said second thread, said preload process is backed-up to the start of the previous script files for both threads to which said current executing script file is dependent; and when said current executing script file is independent of previous script files, said preload process is backed-up to a start of said current executing script file of said first thread.

7. The method of claim 1, wherein when said crash affects only a first one of said threads, said method comprises:
halting said preload imaging process of said first thread;
evaluating whether a second thread that has not crashed may continue its preload process at the point said crash occurred; and
continuing execution of an executing script file of said second thread at said point, when said second thread can resume at said point, while said first thread is backed up to a safe point for resumption of said preload process.

8. The method of claim 1, further comprising:
logging script-level process information in a log stored within said data processing system, said script level process information including a thread identifier (ID) and debug information;
indicating within said log all dependencies for a currently executing script file, wherein all prior script files executed, which affect a current script file, are identified within said log; and
storing state information of said data processing system concurrently with said process information.

9. The method of claim 1, further comprising:
halting all of said preload imaging process;
determining a respective safe point to resume each of said threads; and
re-starting each preload process for each thread at said respective safe point.

10. The method of claim 1, further comprising:
storing said information within said log in human readable format utilizing keywords; and
enabling access to said log by a system operator.

11. The method of claim 1, further comprising:
restoring a context at a resumption point based on the state and process information stored within the log file, wherein said back-up process erases all images and other context information for processes after the resume point in the original preload process.

12. In a data processing system, a system for providing multi-threaded preload imaging process with self-healing functionality, said system comprising:
means creating a re-startable multi-threaded p reload imaging process that parses a log file, which provides debug, dependency, and state information for each thread of said multi-threaded preload process;
means, when a crash of one of the preload processes occurs, for autonomically deducing a state of a preload imaging process utilizing said information within said log file; and
means for dynamically resuming that preload process after restoring the appropriate context information upon discovering a crash, wherein said process is resumed at a point prior to the crash.

13. A data processing system, comprising:
a processor;
an operating system;
a memory component coupled to said processor;
means for initiating a multi-threaded preload imaging process that includes concurrently loading image files of at least two threads, each comprises of multiple script files executed in sequential order;

means for recording at predetermined intervals a log of an operating state of said data processing system along with a current script file being executed for each thread; and
means, when a failure occurs during said multi-threaded preload imaging process, for autonomically responding to said failure by resuming execution of said script files for each of said thread at a point prior to a point said failure occurred determined to be safe for resuming said process.

14. The data processing system of claim 13, further comprising means for dynamically analyzing the log to determine said safe spot for each of said threads, wherein said safe spot is determined based on data recorded within said log.

15. The data processing system of claim 14, wherein said means for dynamically analyzing includes means for parsing a log file, and providing debug and state information.

16. The data processing system of claim 14, wherein said script files are utilized for deploying a preload/configuration to a computer system's hard drive and contains the state information, the thread information captured from the execution stack, timestamps, and the event data for each log entry.

17. The data processing system of claim 13, further comprising:
means for determining whether a current executing script file at a point said failure occurs is independent of previous script files of said thread;
means for backing up a preload process for said thread to a safe point, wherein:
when said current executing script file is dependent on a previous script file said preload process is backed-up to the start of the previous script files to which said current executing script file is dependent; and
when said current executing script file is independent of previous script files, said preload process is backed-up to a start of said current executing script file.

18. The data processing system of claim 13, further comprising:
means for determining whether a first thread's current executing script file at a point said failure occurs is independent of adjacent and previous script files of a second thread;
means for backing up a preload process for both said first thread and said second thread to a safe point, wherein:
when said current executing script file is dependent on an adjacent or previous script of said second thread, said preload process is backed-up to the start of the previous script files for both threads to which said current executing script file is dependent; and
when said current executing script file is independent of previous script files, said preload process is backed-up to a start of said current executing script file of said first thread.

19. The data processing system of claim 13, wherein when said crash affects only a first one of said threads, said data processing system comprises:
means for halting said preload imaging process of said first thread;
means for evaluating whether a second thread that has not crashed may continue its preload process at the point said crash occurred; and
means for continuing execution of an executing script file of said second thread at said point, when said second thread can resume at said point, while said first thread is backed up to a safe point for resumption of said preload process.

20. The data processing system of claim 13, further comprising:
   means for logging script-level process information in a log stored within said data processing system, said script level process information including a thread identifier (ID) and debug information;
   means for indicating within said log all dependencies for a currently executing script file, wherein all prior script files executed, which affect a current script file, are identified within said log; and
   means for storing state information of said data processing system concurrently with said process information.

21. The data processing system of claim 13, further comprising:
   means for halting all of said preload imaging process;
   means for determining a respective safe point to resume each of said threads; and
   means for re-starting each preload process for each thread at said respective safe point.

22. The data processing system of claim 13, further comprising:
   means for storing s aid information within said log in human readable format utilizing keywords; and
   means for enabling access to said log by a system operator.

23. The data processing system of claim 13, further comprising:
   means for restoring a context at a resumption point based on the state and process information stored within the log file, wherein said back-up process erases all images and other context information for processes after the resume point in the original preload process.

24. A computer program product comprising:
   a non-volatile computer readable medium; and
   program code on said non-volatile computer readable medium for providing multi-threaded preload imaging process with self-healing functionality, said program code further comprising code for:
   creating a re-startable multi-threaded preload imaging process that parses a log file, which provides debug, dependency, and state information for each thread of said multi-threaded preload process;
   when a crash of one of the preload processes occurs, autonomically deducing a state of a preload imaging process utilizing said information within said log file; and
   dynamically resuming that preload process after restoring the appropriate context information upon discovering a crash, wherein said process is resumed at a point prior to the crash.

* * * * *